United States Patent [19]

Kimura et al.

[11] 4,394,080
[45] Jul. 19, 1983

[54] WINDING DEVICE FOR CAMERA

[75] Inventors: Hirovuki Kimura, Kawasaki; Tateo Yamada, Yokohama, both of Japan

[73] Assignee: Canon Kabushiki Kaisha, Tokyo, Japan

[21] Appl. No.: 394,506

[22] Filed: Jul. 2, 1982

Related U.S. Application Data

[63] Continuation of Ser. No. 261,802, May 8, 1981, abandoned.

[30] Foreign Application Priority Data

May 13, 1980 [JP] Japan .................................. 55-63091
May 13, 1980 [JP] Japan .................................. 55-63097

[51] Int. Cl.³ .......................... G03B 1/12; G03B 17/36
[52] U.S. Cl. ..................................... 354/173; 354/213; 354/217
[58] Field of Search ............................... 354/170–173, 354/204–206, 212–214, 217, 218

[56] References Cited

U.S. PATENT DOCUMENTS 2,838,984  6/1958  Lareau et al. ...................... 354/213
3,486,431  12/1969  Ettischer ............................ 354/213
3,581,640  6/1971  Kimura ............................. 354/205
3,981,022  9/1976  Iwashita et al. .................... 354/171
4,281,911  8/1981  Engelsmann et al. ............. 354/173
4,297,019  10/1981  Yagi et al. ........................ 354/217 X Primary Examiner—Donald A. Griffin
Attorney, Agent, or Firm—Toren, McGeady and Stanger

[57] ABSTRACT

In a winding device for a camera in which automatic winding of loaded film from a winding start position to a first picture taking position is effected without interrelation to photographic operation, the automatic film winding is enabled by controlling a control member of the winding device by a change-over member which is actuated in response to a counter displaying the numbers of exposed film frames. When in the rewinding mode, in order to insure that the film can be rewound to the winding start position without failure, actuation of the change-over member is not transmitted to the control member.

13 Claims, 4 Drawing Figures

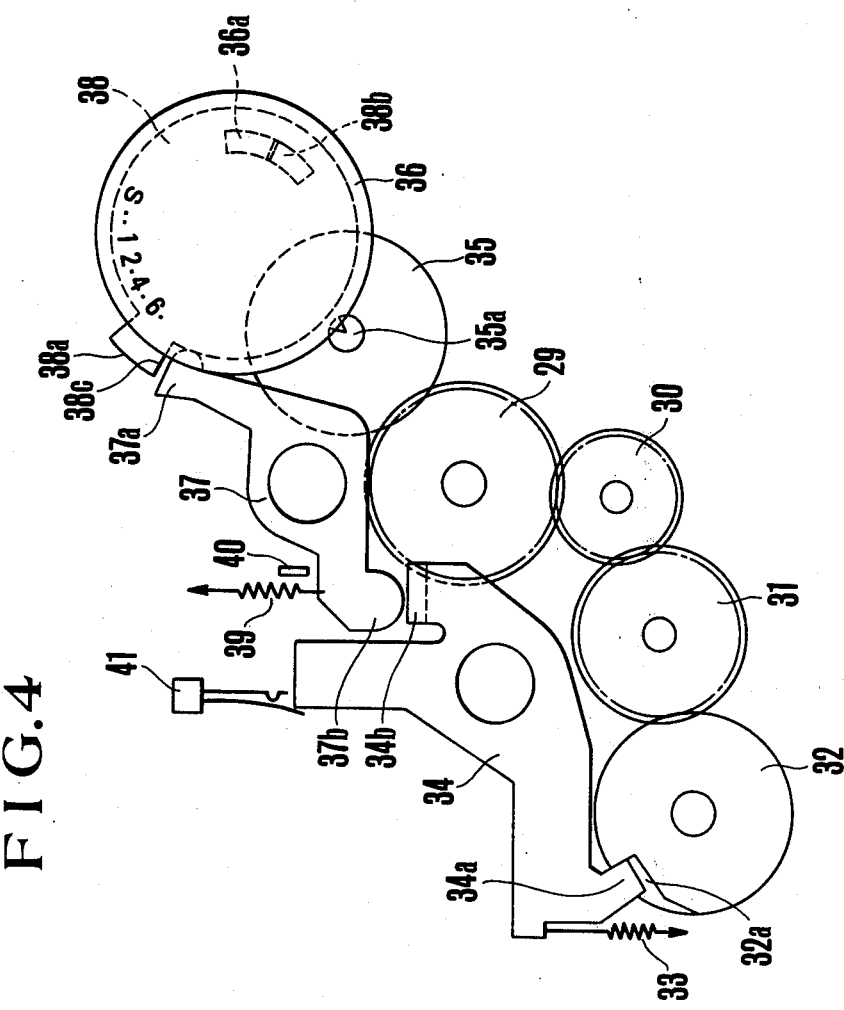

WINDING DEVICE FOR CAMERA

This is a continuation of application Ser. No. 261,802 filed May 8, 1981 and now abandoned.

BACKGROUND OF THE INVENTION

1. Field of the Invention

This invention relates to winding devices for cameras in which winding of the loaded film from the winding start position to the first picture taking position is automatically performed, and more particularly to winding devices for cameras in which the aforesaid operation is controlled by actuation of a counter for displaying the number of exposed frames of film.

2. Description of the Prior Art

In cameras of the type in which the film leader (winding start position) is pulled out far enough to touch directly the takeup spool, for example, cameras using 35 mm film contained in a cartridge, it has been the common practice in the past that winding of even that portion of the loaded film which cannot be used in taking pictures, or which extends from the winding start position to the first fresh frame of film, is also accompanied with a number of successive cycles of shutter charging and releasing operation. However, there has recently come into practical use a camera provided with a winding device eliminating the necessity of release actuations during the aforesaid period and, therefore, providing the function of automatically winding that portion of the loaded film which ranges over a predetermined number of frames from the winding start position to the exposure start position.

However, in a camera having such winding device built in, since the film advancement is made possible by control means arranged to be actuated in response to a counter displaying the footage of film, when rewinding of the exposed film accompanies reversed rotation of the counter so that the operator is able to recognize the rewinding operation, a problem arises in that the control means is caused to act at a time during the period of rewinding operation which corresponds to that of winding operation from the film leader to the first picture frame with the result either that the film cannot be fully rewound to the start position, or that when the rewinding comes to the end, the winding device is switched to the winding mode and the film is wound up again.

SUMMARY OF THE INVENTION

The present invention is provided in consideration of such situations, and its object is to provide a winding device for a camera capable of automatic continuous winding of that portion of the loaded film which ranges from the winding start position to a first fresh frame position, and which, despite the reversed rotation of the counter when in the rewinding mode, ensures that the exposed film can be always rewound to the winding start position without failure.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 4 is an elevational view showing in detail another embodiment of the winding device shown in FIG. 3.

DETAILED DESCRIPTION OF THE PREFERRED EMBODIMENTS

Figure 1:
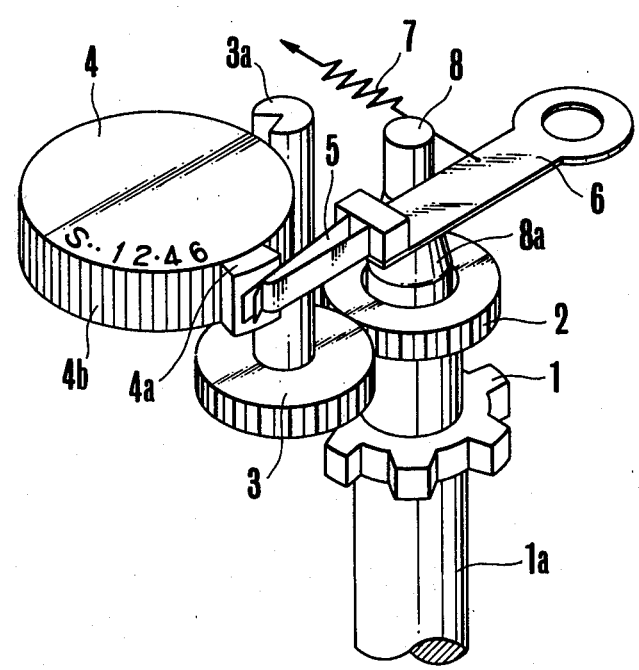
FIG. 1 is a perspective view of the main parts of one embodiment of a winding device according to the present invention.

The present invention will next be described in greater detail by reference to the drawings. FIG. 1 shows one embodiment of a winding device according to the present invention, as applied to a camera which is driven by an electric motor to effect winding or the like. In FIG. 1, is a sprocket rotating along with a rotary shaft 1a by an electric motor (not shown) to control one-frame advancement of the film. 2 and 3 are gears driven when the sprocket 1 rotates, the gear 3 having a grooved shaft 3a at the center of rotation thereof. 4 is a counter drum, in the periphery of which is provided a toothed portion 4b meshing with the grooved portion of the shaft 3a which rotates one revolution each time the film is advanced one frame, and on the periphery of which is provided a projected portion 4a for turning on a switch 5 when the loaded film is wound up from the winding start position to the exposure start position. This switch 5 is connected in a control circuit for automatic continuous winding of the film from the winding start position to the exposure start position without recourse to a camera release (this operation will be hereinafter described as "blind advancement"). Further included in said control circuit is a switch (not shown) which is ON and OFF when the back cover of the camera is opened and closed. 6 is a support lever carrying the aforesaid switch 5 and urged by a spring 7 in a direction to the counter drum. Its angular position is regulated by a slide shaft 8 as the shaft 8 moves up and down when a rewind release button (not shown) is operated. It is also noted that this slide shaft 8 is provided with a tapered portion 8a so that when said slide shaft 8 moves upward, the support lever 6 is turned in a counter-clockwise direction.

After a film cartridge is loaded in the camera, when the back cover is closed, the not-shown switch is turned on. It is at this winding start position that the switch 5 is ON as the movable contact of the switch 5 rides on the projected portion 4a of the counter drum 4. Therefore, when the back cover is closed to turn on the not-shown switch, a current supply to the motor through the aforesaid control circuit starts. Since, during the time when the predetermined number of first frames of film are transported, the switch 5 is maintained closed by the projected portion 4a of the counter drum 4, the camera is operated for blind advancement. As the counter drum 4 rotates, when the exposure start position is reached, the projected portion 4a of the counter drum 4 is moved away from the switch 5. Since, at this time, the switch support lever 6 is regulated in position by the slide shaft 8, the switch 5 is hindered from turning on again. By this time, the blind advancement of the film is completed. After that, the cycle of winding with shutter charging and releasing operation is repeated until the last fresh frame of film is exposed.

To rewind the exposed film, the rewind release button (R button) is pushed upward, whereby the switch support lever 6 is turned in the counter-clockwise direction against the force of the spring 7 by the tapered portion 8a of the slide shaft 8. Therefore, the switch 5 is retracted from the path of movement of the projected portion 4a of the counter drum 4, so that the projected portion 4a of the counter drum 4 no longer turns on the switch 5. Then, as the rewinding proceeds, the counter drum 4 goes back in the reversed direction. It should be pointed out here that since the switch 5 is hereafter maintained always in the OFF position, it does not occur either that the switch 5 is accidentally closed even in the period corresponding to the blind advancement when in the winding mode, or that the switch 5 blocks the projected portion 4a of the counter drum 4 to interrupt the reverse rotation thereof, or that the switch 5 is turned on to render the winding mode operative again.

Figure 2:
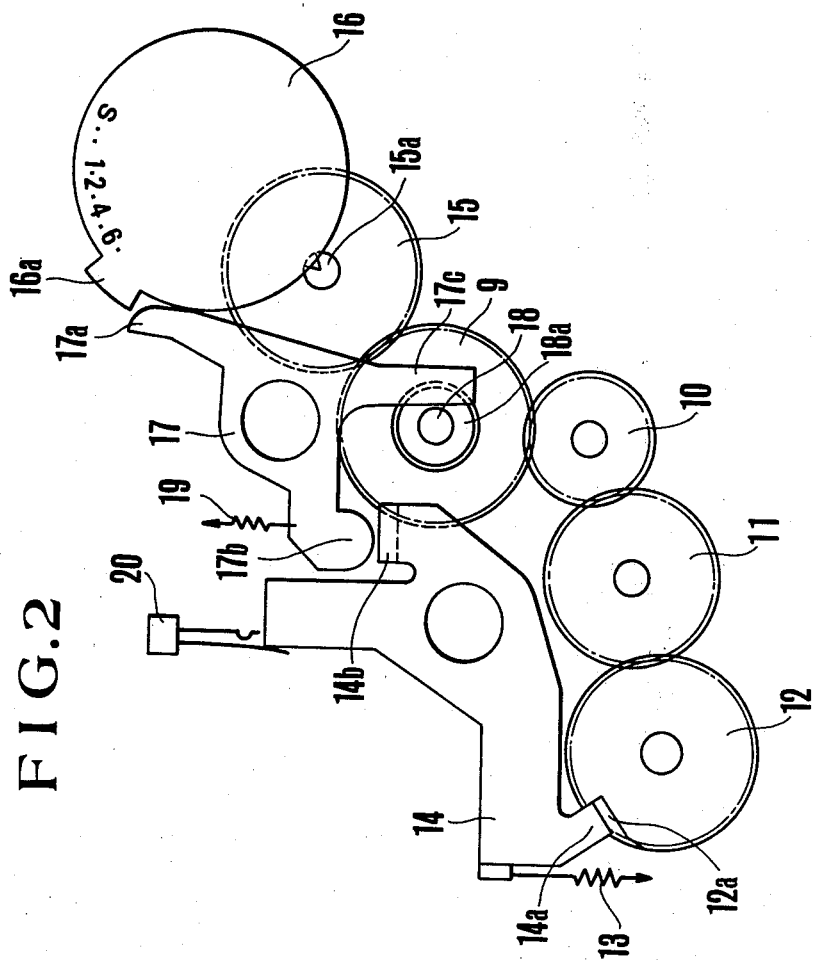
FIG. 2 is an elevational view showing in detail another embodiment of the winding device shown in FIG. 1.

FIG. 2 shows an example of a modification of the winding device of FIG. 1. In the figure, 9 is a gear rotating in unison with the sprocket and driven to rotate by an electric motor (not shown). Rotation of the gear 9 is transmitted through a gear train 10, 11 to a film frame defining cam 12 and also through the grooved shaft 15a of the gear to a counter drum 16. A spring 13 urges a frame defining lever 14 with an end portion 14a thereof to be in contact with the cam 12. Therefore, when the end portion 14a of the lever 14 enters a recessed portion 12a of the cam 12, the frame defining cam is stopped from further rotation whereby the one-frame advancement is completed. 17 is a blind advancement control lever having a first arm 17a which is in contact with the periphery of the counter drum 16, and a second arm 17b which is arranged to press an end portion of the above-described frame defining lever 14. A slide shaft 18 is arranged in a hollow core of the sprocket 9 to be movable in directions perpendicular to the paper when a rewind release button (not shown) is operated, and is tapered in a portion thereof 18a. Also a third arm 17c contacting with the periphery of this slide shaft 18 is provided in the blind advancement control lever 17, and said lever 17 is urged by a spring 19 to be always in contact with the slide shaft 18. It is noted that 20 is a switch for controlling an electric motor (not shown), and this switch is provided together with a switch (not shown) which is changed over when the back cover is opened and closed to control the winding operation.

In the operation of the winding device of FIG. 2 wherein there is shown the exposure start position, before this position is reached, or when in the blind advancement mode from the winding start position to the illustrated position, the end of arm 17a of blind advancement control lever 17 rides on the projected portion 16a of the counter drum 16 so that the lever 17 takes a counter-clockwisemost position. Therefore, the arm 17b pushes the frame defining lever 14 at the end portion 14b thereof, and the frame defining lever 14 is turned in the clockwise direction with its end portion 14a being retracted from the frame defining cam 12. Thus, the sprocket gear 9 is allowed to rotate continuously for winding up the film with the blind exposures.

As the blind advancement proceeds, when the projected portion 16a of the counter drum 16 moves away from the first arm 17a of the blind advancement control lever to the illustrated position of FIG. 2, the second arm 17b of the blind advancement control lever 17 no longer pushes the frame defining lever 14 at the end portion 14b thereof, permitting said lever 14 to be turned in the counter-clockwise direction under the action of the spring 13, whereby its end portion 14a is brought into contact with the frame defining cam 12. When the end portion 14a of said lever enters the pocket 12a of the cam 12, the switch 20 is turned off, thus completing the blind advancement. After that, the cycle of one-frame advancing, shutter charging and releasing operation is repeated in a manner known in the art until the fresh area of the film is all exposed.

To rewind the exposed film, the rewind release button is lifted, whereby the tapered portion 18a of slide shaft 18 is caused to push the third arm 17c of the blind advancement control lever 17 at the side edge thereof and the lever 17 is turned in the counter-clockwise direction. As the arm 17a of lever 17 is retracted from the vicinity of the counter drum 16, and the end portion 14a of frame defining cam 14 is also retracted from the frame defining cam 12, reversed rotation of the counter drum 16 (in the counter-clockwise direction) is allowed to take place without causing mechanical interference between the blind advancement control lever 17 at its first arm 17a with the projected portion 16a of the counter drum 16. Thus, the rewinding is completely carried out.

It will be appreciated from the foregoing that in such embodiments of the present invention, the member for detecting a signal representative of the blind exposures from the counter drum when in the winding mode is set aside when switched to the rewinding mode so that the above-described detecting member no longer interferes with the rotation of the counter in the reversed direction, and there is no possibility of occurrence of a blind advancement when in the rewinding mode, thus achieving a reliable rewinding operation.

Figure 3:
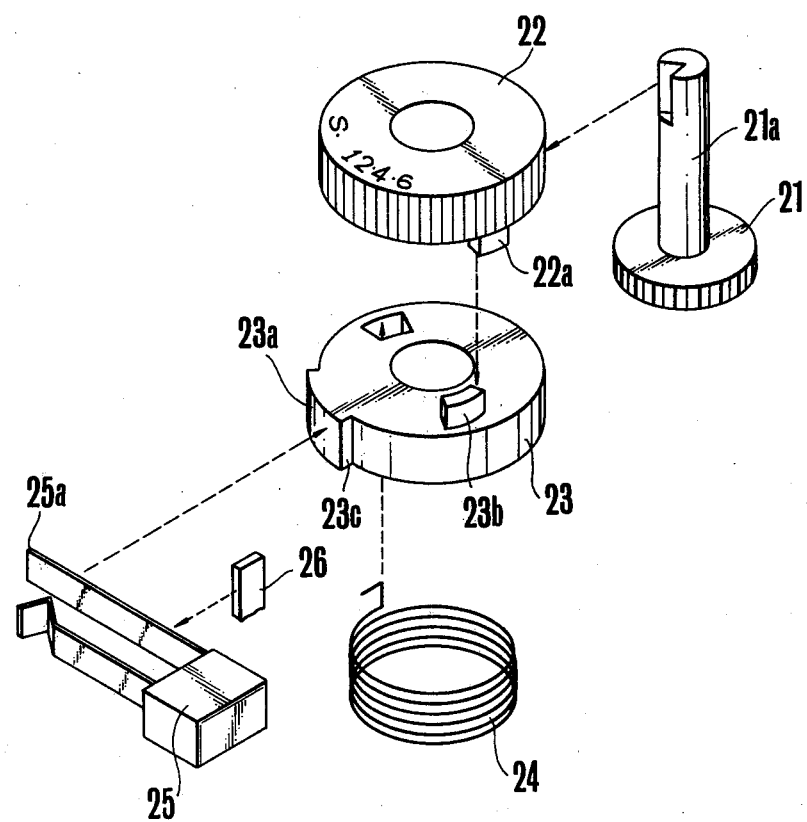
FIG. 3 is an exploded perspective view of a further embodiment of the winding device according to the present invention.

Another embodiment of the present invention is shown in FIG. 3 which is an exploded perspective view of the winding device according to the present invention, as applied to a camera in which an electric motor is used as a drive source for winding and like operation. In the figure, 21 is a counter drive gear receptive of motion from the drive source (not shown) for driving a counter drum 22 to rotate through a cutout shaft 21a. 23 is a blind advancement control cam urged by a spring 24 in a counter-clockwise direction. On the one of the faces of the blind advancement control cam 23 which confronts the counter drum there is arranged an extension 23b for side-to-side abutting engagement with an extension 22a arranged on the cam side of the counter drum 22. Again, the counter drum 22 and blind advancement control cam 23 are rotatably mounted on a shaft (not shown). Positioned adjacent the periphery of the blind advancement control cam 23 is a switch 25 so that in the position of the projected portion 23a of the cam, the movable contact 25a of the switch 25 is brought into contact with the opposite contact, whereby the switch 25 is turned on, and in the other positions, the switch 25 is open.

In operating the device of FIG. 3, with the film loaded in the camera when the back cover of the camera is closed, a switch (not shown) is turned on. Since at the early stage of winding operation, the switch 25 is also turned on by the projected portion 23a of the blind advancement control cam, the motor is energized for performance of the blind advancement. In this winding mode, rotation of the sprocket is transmitted through the counter drive gear 21 to rotate the counter drum 22 in the clockwise direction, which in turn causes the blind advancement control cam 23 to rotate in the clockwise direction as the extension 22a of the drum 22 pushes the extension 23b of the blind advancement control cam 23, while simultaneously charging the spring 24. When the film is wound up by the length corresponding to the predetermined number of frames in blind exposures, the projected portion 23a of the blind advancement control cam 23 is moved away from the movable contact 25a of the switch 25 to turn off the switch 25, thus terminating the blind advancement. At this point in time, the film takes the exposure start position as a result of such automatic continuous winding. After that, in a manner known in the art, the cycle of releasing, winding with charging operation is repeated.

When rewinding the exposed film, reversed rotation of the sprocket (not shown) is transmitted through the counter drive gear 21 to the counter drum 22, whereby the drum 22 is rotated in the counter-clockwise direction. Such counter-clockwise movement of the drum 22 causes counter-clockwise movement of the blind advancement control cam 23 under the action of the spring 24. Since, at this time, the extension 22a of the drum 22 abuts on the extension 23b of the cam 23, by the distance through which the drum 22 reversely rotates, the blind advancement control cam 23 is reversely rotated. As the rewinding proceeds in this fashion, when the end of the movable contact 25a of the switch 25 abuts against the shoulder 23c of the projected portion 23a of the blind advancement control cam 23, the blind advancement control cam 23 is stopped from further counter-clockwise rotation. But, the counter drum 22 continues reversely rotating until the film reaches the winding start position, thus completing the film rewinding. After that, when the back cover of the camera is opened, a lever 26 is actuated through an intermediary (not shown) to take the contact 25a of the switch 25 out of abutting engagement with the projected portion 23a of the blind advancement control cam 23, whereby the blind advancement control cam 23 is returned to the winding start position.

It will be appreciated from the foregoing that in the winding device of FIG. 3 there is no possibility of occurrence of accidental closure of the blind advancement control switch and of hindrance of the counter from returning beyond the exposure start position when in the rewinding mode, and, therefore, a reliable rewinding can be always assured.

FIG. 4 shows another example of embodiment of the winding device of FIG. 3. The illustrated various parts of the device are assumed to be in the exposure start position. In the figure, 29 is a gear rotating in unison with a sprocket and driven to rotate by an electric motor (not shown). Rotation of the gear 29 is transmitted through a gear train 30, 31 to a film frame defining cam 32, and through a cutout shaft 35a of the gear 35 to a counter drum 36. A spring 33 urges an end portion 34a of a frame defining lever 34 to contact with the frame defining cam 32. Therefore, when the end portion 34a of the lever 34 enters a recessed portion 32a of the cam 32, the frame defining cam 32 stops, whereby winding of the film is stopped. 37 is a blind advancement control lever with its one arm 37a in contact with the periphery of the blind advancement control cam 38 and with its second arm facing an end portion 34b of the above-described frame defining lever. This blind advancement control lever 37 is urged in a clockwise direction by a weak spring 39. A blind advancement control cam 38 is arranged in coaxial relation to the counter drum 36, and these parts are engaged with each other by extensions 36a and 38b as shown in FIG. 3. A spring (not shown) urges the blind advancement control cam 38 in a counter-clockwise direction. 40 is an actuator member responsive to the opening of the back cover for rotating the blind advancement control lever 37 in a counter-clockwise direction. 41 is a switch for controlling a motor driving the motorized winding device, this switch 41 along with a switch (not shown) which is changed over when the back cover is opened constituting a control means for the above-described motor.

In operating the motorized winding device of FIG. 4, during the blind advancement of the film from the winding start position to the illustrated position of FIG. 4, that is, the exposure start position, the end of the arm 37a of the blind advancement control lever 37 rides on the projected portion 38a of the blind advancement control cam 38, so that said lever 37 takes the counter-clockwisemost position against the force of the spring 39. Therefore, the arm 37b of lever 37 pushes the frame defining lever 34, whereby the lever 34 is turned in a clockwise direction with its end 34a separated from the frame defining cam 32. Thus, the sprocket gear 29 rotates beyond the range of one-frame advancement.

After the engagement between the blind advancement cam 38 and the blind advancement lever 37 is released, the frame defining lever 34 enters the recessed portion 32a of the frame defining cam 32 to turn off the switch 41. It is also noted that the blind advancement control cam 38 and the counter drum 36 rotate in unison by the engagement of the extension 36a with the extension 38b. When the exposure start position of FIG. 4 is reached, the blind advancement control lever 37 is turned in a clockwise direction by the bias force of the spring 39 so that the arm 37b no longer pushes the frame defining lever 34 at the end portion 34b. Then, the lever 34 is turned in the counter-clockwise direction by the spring 33 until its end portion 34a contacts with the frame defining cam 32. Then, when the end portion 34a of the lever engages in the recessed portion 32a, the blind advancement no longer becomes possible. At this time, the switch 41 is also turned off to stop the driving of the motor. After that, the cycle of film advancing with shutter charging and releasing operation may be repeated.

When in the rewinding mode, reversed rotation of the sprocket is transmitted through the gears 29 and 35 to the counter drum 36. Since, at this time, the blind advancement control cam 38 is urged in the counter-clockwise direction by a spring (not shown), by the distance through which the counter drum 36 reversely rotates (in the counter-clockwise direction), the cam 38 is also rotated. As rewinding proceeds, the end of the arm 37a of the blind advancement control lever 37 abuts on the projected portion 38c of the blind advancement control cam 38 (in the illustrated position), whereby rotation of the blind advancement control cam 38 is hindered by this lever 37. But, since the counter drum 36 can be further rotated, it continues rotating until the initial position, thus completing the rewinding. That is, in the device of FIG. 4, when rewinding the film, the reverse rotation of the counter drum 36 is not hindered from rotating even for the blind advancement portion, and the rewinding operation when completed resets all the parts to the initial position except the blind advancement control cam which is reset to the initial position by the actuator member 40 in response to opening of the back cover of the camera or the like.

As in the above, in the winding device in this embodiment, the counter drum which rotates in response to rotation of the sprocket and the blind advancement control cam which is rendered effective when in the winding mode are arranged to rotate independently of each other when in the rewinding mode. Therefore, problems whereby the counter drum cannot be reset to the initial position and whereby winding starts again at the time of termination of the rewinding can be eliminated. Such a winding device assures a reliable rewinding operation.

It is noted that in the embodiments of FIGS. 3 and 4, the blind advancement control cam may be provided with a one-way clutch known in the art so that there can occur no interference to the counter drum when in the rewinding mode.

Hereinbefore, the present invention has been described in connection with the case where the winding device is driven by a motor. It should be noted that the winding device may be manually driven.

While specific embodiments of the invention have been shown and described in detail to illustrate the application of the inventive principles, it will be understood that the invention may be embodied otherwise without departing from such principles.

What is claimed is:

1. A winding device for a camera in which winding of a loaded film from a winding start position to an exposure start position is made automatically without interrelation to exposure operations, comprising:
    display means for displaying the number of film frames exposed during exposure operations, said display means being rotatable in response to winding and rewinding of the film and being restorable to an initial state before film winding by completion of film rewinding;
    control means operative to automatically enable winding of loaded film, said control means being movably supported;
    changeover means associated with rotation of said display means, said display means being in contact with said control means to maintain said control means operative while said display means displays the region from the winding start position to the exposure start position; and
    displacing means for displacing said control means out of the operative zone of the changeover means, said displacing means operating in response to a rewind releasing operation.

2. A device according to claim 1 wherein said control means is a switch for controlling the drive of an electric motor.

3. A device according to claim 2 wherein said switch is provided on a pivotal member which is kept at a predetermined position by engagement with said displacing means.

4. A device according to claim 1 wherein said control means is a lever rendering inoperative a mechanism for performing a one-frame advancement of the film.

5. A winding device for a camera in which winding of a loaded film from a winding start position to an exposure start position is made automatically without interrelation to exposure operations, comprising:
    display means for displaying the number of film frames exposed during exposure operations, said display means being rotatable in a first direction in response to film winding and in a second direction in response to film rewinding, and being restorable to its initial state before commencement of film winding by completion of film rewinding;
    control means for enabling automatic windup of the loaded film; and
    changeover means in integral association with said display means when it rotates in said first direction, and movable independently from said display means when it rotates in said second direction, said changeover means having a projection which is brought into contact with said control means to render it operative while the display means displays the region from the winding start position to the exposure start position, said changeover means being restricted in its movement when said display means rotates in said second direction.

6. A device according to claim 5 wherein said changeover means is restricted in its movement by engagement between said projection with an end portion of said control means.

7. A device according to claim 6 further comprising bias means for biasing said changeover means toward its initial position.

8. A device according to claim 7 further comprising resetting means for releasing engagement between said projection of said changeover means with the end portion of said control means, said resetting means being actuated by opening of a back cover of said camera.

9. A device according to claim 8 wherein said control means is a switch for controlling the drive of an electric motor.

10. A device according to claim 8 wherein said control means means is a lever rendering inoperative a mechanism for performing a one-frame advancement of the film.

11. A winding device for a camera in which winding of a loaded film from a winding start position to an exposure start position is automatically carried out without interrelation to exposure operations, comprising:
    display means responsive to advancement of said film for displaying the number of film frames;
    control means rendering it possible to automatically wind up the loaded film;
    changeover means rendering said control means operative when said display means presents a display of the interval from the film winding start position to the exposure start position; and
    displacing means causing said control means to be displaced so as to render impossible the changeover by said changeover means when in the film rewinding mode, said displacing means being actuated in response to a rewind releasing operation;
    said control means comprising a switch for controlling the drive of an electric motor, said switch being provided on a pivotal lever and being displaceable out of the range of movement of said changeover means.

12. A device according to claim 11, wherein said change-over means is a cam provided on the periphery of said display means.

13. A winding device for a camera for automatically effecting winding of loaded film from a winding start position to an exposure start position comprising:

display means for displaying the number of film frames exposed during exposure operation of said camera, said display means being rotatable in response to winding and rewinding of said film and being restored to an initial position upon completion of film rewinding prior to commencement of film winding;

control means for automatically effecting winding of loaded film;

switch means including means movable with said display means for rendering said control means operative to wind said film during an interval from said winding start position until said exposure start position; and changeover means movable in response to changeover between film winding and film rewinding operation to render said switch means inoperative from automatically effecting film winding during exposure operations and during film rewinding.

* * * * *

UNITED STATES PATENT AND TRADEMARK OFFICE
CERTIFICATE OF CORRECTION

PATENT NO. : 4,394,080
DATED : July 19, 1983
INVENTOR(S) : Hiroyuki et al

It is certified that error appears in the above-identified patent and that said Letters Patent is hereby corrected as shown below:

In the heading of the Title page [75] should Read as follows:

[75] Inventor(s): Hiroyuki Kimura, Kanagawa-ken;
Tateo Yamada, Kanagawa-ken,
both of Japan Signed and Sealed this Fifth Day of March 1985

[SEAL]

*Attest:*

DONALD J. QUIGG

*Attesting Officer*  *Acting Commissioner of Patents and Trademarks*